United States Patent [19]

Yamamoto et al.

[11] Patent Number: 4,593,974
[45] Date of Patent: Jun. 10, 1986

[54] PLASTIC OPTICAL FIBER

[75] Inventors: Takashi Yamamoto, Hiroshima; Kozi Nishida, Otake; Akio Tateishi, Tokyo, all of Japan

[73] Assignee: Mitsubishi Rayon Co., Ltd., Tokyo, Japan

[21] Appl. No.: 563,245

[22] Filed: Dec. 19, 1983

[30] Foreign Application Priority Data

Dec. 24, 1982 [JP] Japan ................. 57-230436

[51] Int. Cl.$^4$ ................. G02B 6/00
[52] U.S. Cl. ................. 350/96.34; 428/373; 428/394
[58] Field of Search ............ 350/96.33, 96.34; 428/375, 373, 374, 394; 526/245

[56] References Cited

U.S. PATENT DOCUMENTS

| 3,532,659 | 10/1970 | Hager et al. | 526/245 X |
| 3,930,103 | 12/1975 | Chimura et al. | 350/96.34 |
| 3,993,834 | 11/1976 | Chimura et al. | 526/245 X |
| 4,500,694 | 2/1985 | Ohmori et al. | 526/245 |

FOREIGN PATENT DOCUMENTS

| 789972 | 7/1968 | Canada | 428/373 |
| 128516 | of 0000 | European Pat. Off. | 526/245 |
| 94056 | 11/1983 | European Pat. Off. | 526/245 |
| 42261 | 10/1978 | Japan | 428/373 |
| 15411 | 1/1984 | Japan | 526/245 |
| 15412 | 1/1984 | Japan | 526/245 |

Primary Examiner—Lorraine T. Kendell
Attorney, Agent, or Firm—Oblon, Fisher, Spivak, McClelland & Maier

[57] ABSTRACT

A plastic optical fiber having an enhanced light transmission and satisfactory mechanical and chemical properties is composed of a core having a refractive index $n_1$, a cladding layer having a refractive index $n_2$, and a protective layer having a refractive index $n_3$, the refractive indices $n_1$, $n_2$, and $n_3$ satisfying the relationships $$n_1 - n_2 \geq 0.01$$

and $$n_3 - n_2 > 0$$

and the cladding layer being composed of a copolymer of:

(A) 20% to 99.95% by weight of at least one comonomer selected from fluoroalkyl acrylates and methacrylates, (B) 0.05% to 10% by weight of at least one vinyl comonomer having a hydrophilic radical, and (C) 0% to 79.95% by weight of at least one other vinyl comonomer capable of copolymerizing with the comonomers (A) and (B).

14 Claims, 5 Drawing Figures

PLASTIC OPTICAL FIBER

BACKGROUND OF THE INVENTION

1. Field of the Invention

The present invention relates to a plastic optical fiber having a three-layered structure comprising a core, a cladding layer, and a protective layer.

2. Description of the Prior Art

Improvements in the light transmission properties of optical fibers have led to their increased use in the fields of optical communication and the like. Conventional optical fibers which have been developed hitherto include those having a core consisting of a glass and those having a core consisting of a plastic material. Conventional glass core optical fibers exhibit excellent light transmission properties, and, therefore, are useful in the field of long-distance communication. However, this type of optical fiber exhibits poor flexibility and, therefore, easily breaks. Accordingly, these optical fibers cannot be advantageously used in the field of short-distance communication, wherein a high-order fabrication is necessary. Plastic core optical fibers, on the other hand, can transmit light only a relatively short distance. However, this type of optical fiber exhibits excellent flexibility and, thus, is very useful in the field of short-distance communication.

Conventional plastic core optical fibers which have been developed hitherto are mainly of a step-index type. A step-index type optical fiber is composed of a core comprising a polymer of a high refractive index and a cladding layer comprising a polymer of a low refractive index. When light is applied to the step-index type optical fiber, the light is transmitted through the core while being reflected entirely on the interface between the core and the cladding layer. Therefore, the important requisites for the optical fiber are that the cladding layer be firmly bonded to the core and that the cladding layer be highly resistant to the formation of cracks therein.

The core constituent is preferably composed of an amorphous material having a high optical transparency. Generally, polymethyl methacrylate or polystyrene is used as the core material.

An optical fiber comprising a core consisting of polystyrene and a cladding layer consisting of polymethyl methacrylate is already known in Japanese Examined Patent Publication (Kokoku) No. 43-8978. The bonding property of polystyrene to polymethyl methacrylate, however, is unsatisfactory. Therefore, the resultant optical fiber has unsatisfactory optical properties at the interface between the core and the cladding layer. On the other hand, there are known several references concerning an optical plastic fiber comprising a core consisting of polymethyl methacrylate exhibiting a high transparency and a cladding layer consisting of a fluorine-containing polymer.

For example, Japanese Examined Patent Publication (Kokoku) Nos. 43-8978, 56-8321, 56-8322, and 56-8323 disclose plastic optical fibers comprising a core consisting of polymethyl methacrylate and a cladding layer consisting of a polymer of fluorinated alkyl methacrylate.

However, these cladding layers which have been disclosed hitherto generally are unsatisfactory in respect to the bonding property to the core constituent, moldability suitable for ensuing a uniform and smooth core-cladding layer interface structure, mechanical resistance to friction and bending, heat resistance capable of withstanding the working environment and processing conditions, resistance to chemicals, and the like. On the contrary, a polymer for a cladding constituent capable of completely meeting these requirements is not known.

Further, a mechanically and chemically protected cable comprising an optical fiber coated with a polymethyl methacrylate resin layer has been proposed in, for example, Japanese Unexamined Utility Model Publication (Kokai) No. 50-154741. However, the light transmission properties of this cable are not concretely described.

The present inventors made extension studies to improve a conventional composite spinning system so as to enhance light reflectance on the interface between the core and the cladding layer of the resultant optical fiber, thereby enhancing the light transmission properties thereof, and at the same time to eliminate or improve various defects concerning the mechanical properties, heat resistance, and chemical resistance of conventional cladding polymers and to reduce substantially the amount of an expensive cladding polymer to be used, thereby realizing a reduction in the cost of the optical fiber. As a result, the present invention was attained.

SUMMARY OF THE INVENTION

An object of the present invention is to provide a plastic optical fiber having enhanced light transmission properties and an improved light reflectance on the interface between a core and a cladding layer.

Another object of the present invention is to provide a plastic optical fiber having a cladding layer formed around a core and exhibiting enhanced mechanical properties, heat resistance, and resistance to chemicals.

Still another object of the present invention is to provide a plastic optical fiber in which a cladding layer is made of a relatively cheap polymeric material, thereby rendering the plastic optical fiber low in cost.

The above-mentioned objects can be attained by the plastic optical fiber of the present invention which comprises:

(1) a core consisting of a polymeric material and having a refractive index $n_1$, (2) a cladding layer consisting of a polymeric material and having a refractive index $n_2$, and (3) a protective layer consisting of a polymeric material and having a refractive index $n_3$, which optical fiber is characterized in that the refractive indices $n_1$, $n_2$, and $n_3$ satisfy the relationships $$n_1 - n_2 \geq 0.01$$

$$n_3 - n_2 > 0$$

and in that the cladding layer-forming polymeric material consists essentially of a copolymer of;

(A) 20% to 99.95% by weight of at least one fluorine-containing comonomer selected from the group consisting of fluoroalkyl acrylates and fluoroalkyl methacrylates, (B) 0.05% to 10% by weight of at least one vinyl comonomer having a hydrophilic radical, and (C) 0% to 79.95% by weight of at least one other vinyl comonomer capable of copolymerizing with the above-mentioned comonomers (A) and (B).

DESCRIPTION OF THE PREFERRED EMBODIMENT

Figure 2:
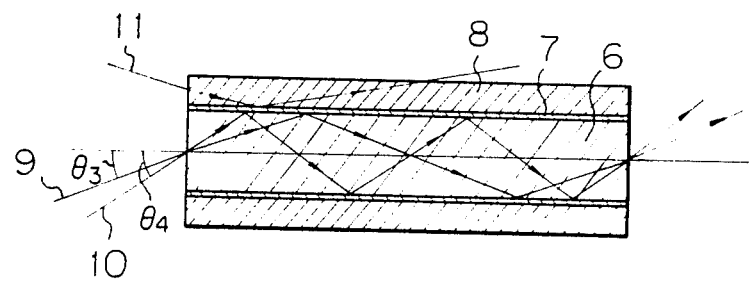
FIG. 2 shows a longitudinal cross-sectional profile of a plastic optical fiber of the present invention.
Figure 3:
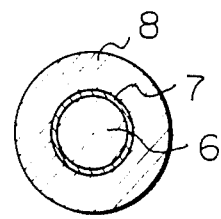
FIG. 3 shows a lateral cross-sectional profile of the plastic optical fiber of FIG. 2.

As is indicated in FIGS. 2 and 3 showing the longitudinal and lateral cross-sectional profiles of the optical fiber of the present invention, the optical fiber has a three-layered structure composed of a core 6, a cladding layer 7, and a protective layer 8. Light is transmitted through the core 6 and is reflected entirely by the cladding layer 7, whereby the light is confined in the core 6. The protective layer 8 having a composition similar to or different from that of the core 6 serves to protect the cladding layer 7.

The polymeric materials usable for the core include polymethyl methacrylate, polystyrene, and deuterium-substituted derivatives thereof. For example, when the polymeric material is a methacrylic polymer, the polymer preferably contains at least 70% by weight of polymerized methyl methacrylate units. The methacrylic polymer may contain up to 30% by weight of other copolymerized vinyl monomer units. As a preferable monomer copolymerizable with methyl methacrylate, there may be mentioned, for example, methyl acrylate and ethyl acrylate.

Deuterated polymethyl methacrylates include those having a hydrogen content of 40 mg or less per 1 g of the polymer, e.g., a polymer from (d-5) methyl methacrylate, which are slightly inferior in properties, as well as a polymer from (d-8) methyl methacrylate in which deuterium is substituted for all eight hydrogen atoms.

The polymeric material constituting the cladding layer of the optical fiber of the present invention is a copolymer of: (A) 20% to 99.95% by weight of at least one fluorine-containing comonomer selected from fluoroalkyl acrylate or fluoroalkyl methacrylate, (B) 0.05% to 10% by weight of at least one vinyl comonomer having a hydrophilic radical, and (C) 0% to 79.95% by weight of at least one other vinyl comonomer capable of copolymerizing with the above-mentioned comonomers (A) and (B).

The fluoroalkyl acrylates or methacrylates usable as the fluoro-comonomer (A) are preferably those having the formula:

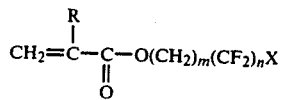

wherein R represents a member selected from the group consisting of a hydrogen atom and a methyl radical, m represents an integer of 1 to 6, n represents an integer of 1 to 10, and X represents a member selected from the group consisting of a hydrogen atom and a fluorine atom.

As a particularly preferable fluorine-containing comonomer (A), there may be mentioned, for example, 2,2,2-trifluoroethyl acrylate and methacrylate, 2,2,3,3-tetrafluoropropyl acrylate and methacrylate, and 2,2,3,3,3-pentafluoropropyl acrylate and methacrylate.

The vinyl comonomer (B) having a hydrophilic radical is effectively used in the present invention because it is highly effective for enhancing the bonding property of a polyfluoroalkyl acrylate or methacrylate to the core- and the protective layer-forming polymeric materials. Surprisingly, the incorporation of the hydrophilic vinyl comonomer (B) into the cladding layer-forming copolymer makes it possible to enhance the resistance of the resulant cladding layer-forming polymeric material to thermal decomposition, without degrading the other inherent properties thereof necessary to the plastic optical fiber.

The hydrophilic vinyl comonomer (B) usable for the present invention includes ethylenically unsaturated carboxylic acid monomers, ethylenically unsaturated epoxy monomers, ethylenically unsaturated carboxylic amides, N-alkylcarboxylic amides, N-methylolcarboxylic amides and alkyl ethers of the above-mentioned amides, and ethylenically unsaturated polycarboxylic acids. Examples of the hydrophilic vinyl comonomers are as follows.

Examples of the ethylenically unsaturated mono-, and di-carboxylic acids include acrylic acid, methacrylic acid, crotonic acid, maleic acid, fumaric acid, itaconic acid, glutaconic acid, 3-methylglutaconic acid, muconic acid, dihydromuconic acid, methylenemalonic acid, citraconic acid, mesaconic acid, and methyleneglutaric acid. Acrylic and methacrylic acids are particularly preferable for enhancing the bonding property of the cladding layer-forming copolymer to the core- and protective layer-forming polymeric materials. Also, methacrylic acid is preferable for enhancing the thermal decomposition resistance of the cladding layer-forming polymeric material.

Examples of the ethylenically unsaturated epoxy monomer are glycidyl methacrylate, methylglycidyl methacrylate, and allylglycidyl ether. Glycidyl methacrylate and methylglycidyl methacrylate are effective for enhancing the bonding property of the cladding layer-forming copolymer to the core- and protective layer-forming polymeric materials.

The ethylenically unsaturated carboxylic amides, N-alkylcarboxylic amides, N-methylolcarboxylic amides, and alkyl ethers of the above-mentioned amides include acrylamide, methacrylamide, N-methylacrylamide, N-diethylacrylamide, mono-, di-, and ester-amides of maleic, fumaric, itaconic, and other ethylenically unsaturated dicarboxylic acids, N-methylol acrylamide, N-methylol methacrylamide, and hydrophilic ethers of the above-mentioned N-methylol amide compounds, for example, methyl ether, ethyl ether, 3-oxabutyl ether, 3,6-dioxaheptyl ether, and 3,6,9-trioxadecyl ether of N-methylol acrylamide and methacrylamide. The above-mentioned amide compounds are effective for enhancing the bonding property of the cladding layer-forming copolymer to the core- and protective layer-forming polymeric materials.

The hydrophilic vinyl comonomers may include addition reaction products of ethylene oxide with at least one member selected from N-methylol acrylamide, N-methylol methacrylamide, and N-methylol maleic imide; N-vinyl amides, for example, N-vinyl acetamide; and N-vinyl pyrrolidone.

The ethylenically unsaturated polycarboxylic acids include ester condensation products of at least one member selected from hydroxypropyl acrylate, hydroxypropyl methacrylate, hydroxyethyl acrylate, hydroxyethyl methacrylate, hydroxymethyl acrylate, and hydroxymethyl methacrylate with at least one member selected from succinic anhydride, phthalic anhydride, maleic anhydride, and trimellitic anhydride.

In the cladding layer-forming copolymer of the present invention, the hydrophilic vinyl comonomer (B) is contained in an amount of from 0.05% to 10% by weight. When the content of the hydrophilic vinyl comonomer (B) is less than 0.05% by weight, the resultant copolymer has an unsatisfactory bonding property and, sometimes, an unsatisfactory thermal decomposition resistance. On the other hand, when the content of the hydrophilic vinyl comonomer (B) is more than 10% by weight, the resultant copolymer exhibits not only a reduced refractive index but also an increased activity on undesirable reactions between the polar functional radicals, for example, a ring opening reaction in the case of epoxy radicals and a dimer-forming reaction or a decarboxylation reaction in the case of carboxyl radicals which reactions deteriorate significantly the inherent physical properties of the cladding layer-forming polymeric material.

The vinyl comonomers (C) copolymerizable with the fluorine-containing comonomer (A) and the hydrophilic vinyl comonomer B include methyl methacrylate, ethyl methacrylate, n-propyl methacrylate, n-butyl methacrylate, nonyl methacrylate, lauryl methacrylate, methyl acrylate, n-butyl acrylate, 2-ethylhexyl acrylate, styrene, α-methyl styrene, and maleic anhydride. Methacrylic acid esters are preferable because of their superior copolymerizing activity.

If it is desired that the cladding layer have only a reduced refractive index, the cladding layer-forming copolymer preferably contains no vinyl comonomer (C). However, since the vinyl monomer (C) is effective for controlling the refractive index of the cladding layer-forming copolymer, it is preferable that the vinyl comonomer (C) be contained in the cladding layer-forming copolymer in an amount of up to 79.95% by weight. A vinyl comonomer (C) content exceeding 79.95% by weight causes the resultant copolymer to have an excessively high refractive index. Such a copolymer is unsuitable as the cladding layer-forming polymeric material. Further, the vinyl comonomer (C) is also effective for controlling the glass transition point of the cladding layer-forming copolymer. If a vinyl comonomer (C) which can be converted into a homopolymer having a high glass transition point is used as the comonomer (C), the resultant cladding layer-forming copolymer exhibits an increased glass transition point. If a vinyl comonomer which is capable of being converted into a homopolymer having a low glass transition point is used as the comonomer, the resultant cladding layer-forming copolymer exhibits a decreased glass transition point. Therefore, the vinyl comonomer (C) may be selected in consideration of the use of the optical fiber.

In the copolymerization of the comonomers (A), (B), and (C) usable for the present invention, any conventional radical polymerization initiator may be used as the polymerization initiator. Examples of the polymerization initiator are organic peroxides such as di-tert-butyl peroxide, dicumyl peroxide, methylethylketone peroxide, tert-butylperphthalate, tert-butyl perbenzoate, methylisobutylketone peroxide, lauloyl peroxide, cyclohexyl peroxide, 2,5-dimethyl-2,5-di-tert-butyl peroxyhexane, tert-butyl peroctanoate, tert-butyl perisobutylate, and tert-butyl peroxyisopropyl carbonates; and azo compounds such as methyl-2,2'-azo-bis-isobutylate, 1,1'-azo-bis-cyclohexane carbonitrile, 2-phenyl-azo-2,4-dimethyl-4-methoxyvaleronitrile, 2-carbamoyl-azo-bis-isobutylonitrile, 2,2'-azo-bis(2,4-dimethylvaleronitrile), and 2,2'-azo-bis-isobutylonitrile.

In the copolymerization of the comonomers (A), (B), and (C), a chain transfer agent consisting of an alkyl mercaptan, which is usually used as an agent for controlling the degree of polymerization, may be used.

The polymerization method usable for the polymerization of the comonomers (A), (B), and (C) includes emulsion polymerization, suspension polymerization, bulk polymerization, and solution polymerization methods. The bulk polymerization method is preferable for producing a copolymer having an enhanced degree of purity.

The relationship between the refractive indices $n_1$, $n_2$, and $n_3$ of the respective layers of the optical fiber according to the present invention is now explained.

It is necessary that the refractive index $n_1$ of the core and the refractive index $n_2$ of the cladding layer satisfy the relationship $$n_1 - n_2 \geq 0.01 \tag{I}$$

If the relationship (I) is not satisfied, the resultant optical fiber exhibits a reduced reflectance of light on the interface between the core and the cladding layer and, thus, a high light transmission loss. It is preferable that the difference, $n_1 - n_2$, be as large as possible. However, the difference $n_1 - n_2$ is usually in the range of from 0.01 to 0.20.

Further, it is necessary that the refractive index $n_2$ of the cladding layer and the refractive index $n_3$ of the protective layer satisfy the relationship $$n_3 - n_2 > 0 \tag{II}$$

Figure 1:
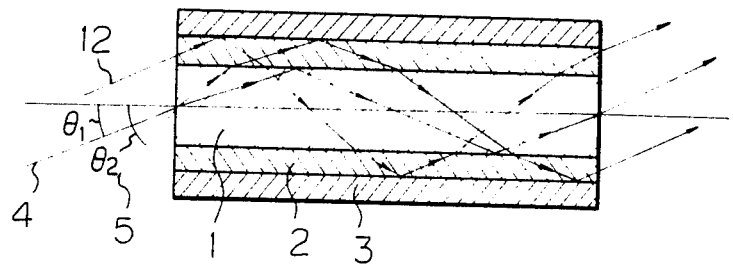
FIG. 1 shows a longitudinal cross-sectional profile of a conventional plastic optical fiber.

If the relationships (I) and (II) are not satisfied, a noise tends to be generated in the resultant plastic optical fiber because, referring to FIG. 1, light 12 directly entering the cladding layer or light 5 having a large aperture angle $\theta_2$ and being reflected entirely on the interface between the cladding layer and the protective layer is transmitted through the optical fiber. Only light 4 having a small aperture angle $\theta_1$ is reflected on the interface between the cladding layer and core without generating noise. A longitudinal cross-sectional view and a lateral cross-sectional view of the optical fiber of the present invention satisfying the relationships (I) and (II) are shown in FIGS. 2 and 3, respectively. As is shown in FIG. 2, in the optical fiber of the present invention satisfying the relationships (I) and (II), light 9 and 10 entering the core 6 at aperture angles $\theta_3$ and $\theta_4$ respectively, is transmitted through the core while being reflected entirely on the interface between the core 6 and the cladding layer 7, and light 11 directly entering the protective layer 8, which may generate a noise, is reflected on the interface between the cladding layer 7 and the protective layer 8 so that no noise is generated in the optical fiber.

Especially by controlling the refractive index $n_1$ of the core-forming polymeric material and the refractive index $n_3$ of the protective layer-forming polymeric material so that they satisfy the relationship $$n_3 - n_2 > 0 \tag{II}$$

it is possible to obtain an optical fiber which does not easily generate a noise and which has an excellent mechanical strength, excellent chemical properties, especially solvent resistance, and an excellent processability. It is particularly preferable that $n_1$ and $n_3$ be virtually equal.

The cladding layer of the present invention is excellent in thermal resistance and bonding property. When the cladding layer is formed simultaneous with the core and the protective layer by a composite spinning method, undesirable abnormal phenomena such as foaming and whitening do not occur in the cladding layer at a wide molding temperature range of from 180° C. to 270° C. Further, the resultant optical fiber has a remarkably excellent feature in that the numerical aperture, which is an important measurement depending on the interface condition between the core and the cladding layer, is close to the theoretical numerical aperture calculated from the refractive indices of the core and the cladding layer. This is because the cladding layer of the present invention exhibits an extremely excellent thermal decomposition resistance and has an enhanced bonding property to the core. Further, the cladding layer of the present invention has an excellent bonding property to the protective layer, thereby enhancing the mechanical properties, such as flexing resistance, of the optical fiber.

In the present invention, it is preferable that the composition of the protective layer-forming polymeric material be the same as that of the core. In the case where deuterated methacrylate polymers are used to form the core, the protective layer may be composed of methyl methacrylate copolymers in view of the cost of production.

Figure 4:
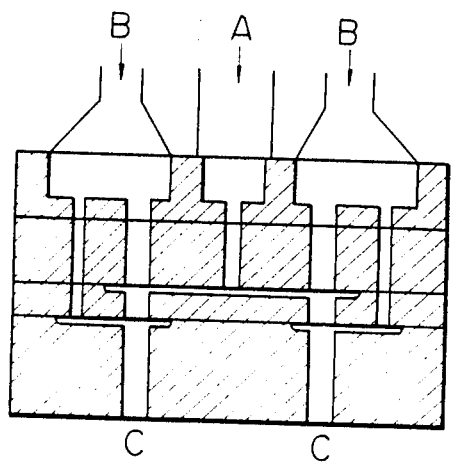
FIG. 4 shows a cross-sectional profile of a spinneret usable for producing the plastic optical fiber of the present invention.

The optical fiber having a three-layered structure according to the present invention can be prepared by using a composite spinning apparatus comprising a pair of melt extruders for the core constituent and a melt extruder for the cladding constituent. The core- and protective layer-forming polymeric material is melted in the melt extruder and a certain amount of the melt is fed into a spinning head by means of a measuring pump. The cladding layer-forming copolymer is fed into the spinning head in the same manner. The core-forming polymeric material and the cladding layer-forming copolymer are extruded through a spinneret in the spinning head having, for example, the structure shown in FIG. 4 so as to form a filamentary stream of the polymers having a three-layered structure. The extruded filamentary stream is then solidified by cooling, is optionally drawn, and, finally, is wound up on a wind-up roll. Referring to FIG. 4, a cladding layer-forming copolymer melt is introduced into a passage A while a core-forming polymer melt is introduced into passages B where the core-forming polymer melt is divided into a core layer portion and a protective layer portion. The cladding layer-forming copolymer stream, the core-forming polymer stream, and the protective layer-forming polymer stream are combined so as to provide a stream of a three-layered structure, after which the stream is extruded through orifices C.

The spinneret plays a very important role in attaining a reduction in the light transmission loss of the optical fiber, i.e., in ensuring a smoothness of the interface between the core and the cladding layer. The present inventors investigated a conventional nozzle of a core-cladding, thus-layered structure. As a result, the present inventors discovered that since the cladding layer-forming copolymer flows in the form of a very thin layer in the spinning nozzle, the very thin layer cannot flow smoothly due to friction between it and the wall of the passage. This phenomenon easily results in minute unevennesses on the interface between the core and the cladding layer. The present inventors also discovered that when the polymers are extruded through the spinning nozzle, the interface between the core and the cladding layer is often damaged due to a synergistic effect of the Barus effect, i.e., minute scratches on the periphery of the nozzle opening and stains on the nozzle surface occur.

In the case of a spinning nozzle of a three-layered structure usable for the production of the optical fiber of the present invention, the ratio L/D of the cladding layer constituent can be minimized after the core constituent is coated in a melted state with the cladding layer constituent. The portion of the cladding layer constituent having a large ratio L/D, which is effective for preventing the generation of fiber unevenness, flows without directly contacting the wall of the passage. Furthermore, unevennesses which occur on the interface between the core and the cladding layer during the extruding procedure are alleviated and absorbed by the outermost layer, thereby ensuring the smoothness of the core-cladding layer interface.

The three-layered structure of the present invention is effective for enhancing not only the bonding property of the cladding layer to the core layer and the outermost protective layer but also the thermal resistance of the cladding layer. Since the weak cladding layer is protected by the strong outermost protective layer, the thermal resistance of the cladding layer is enhanced, and even if the optical fiber is handled somewhat roughly, the light transmission properties thereof are not affected. Therefore, the present invention enables the realization of a remarkable reduction in the light transmission loss of industrial mass production-type plastic optical fibers.

In the three-layer structured optical fiber of the present invention, the thickness and size of the core, the cladding layer, and the protective layer are variable depending on the end use of the optical fiber. For example, when the core has a diameter of 100 to 1,000 μm, the thickness of the cladding layer may be in the range of from 3 to 20 μm, preferably from 3 to 10 μm, and the thickness of the protective layer may be in the range of from 3 to 20 μm, preferably from 3 to 10 μm. This reduction in the thickness of the cladding layer and protective layer results from the use of the novel polymeric material in the cladding layer. In the spinneret shown in FIG. 4, the proportion in weight of the core-forming polymer and the protective layer-forming polymer can be controlled by changing the diameter and length of the orifice of the dispenser.

Figure 5:
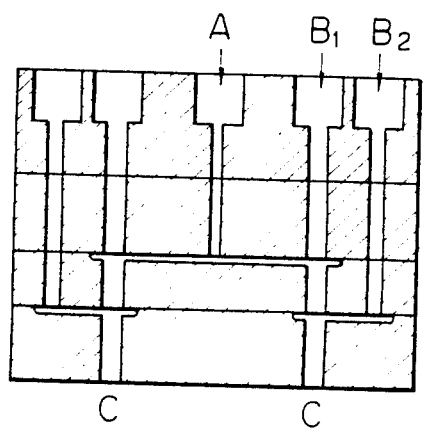
FIG. 5 shows a cross-sectional profile of another spinneret usable for producing the plastic optical fiber of the present invention.

FIG. 5 is a cross-sectional view of an example of a spinneret wherein a molten core-forming polymer to be fed into the spinneret is previously distributed into a core portion and a protective layer portion. A cladding layer-forming polymer melt is fed into a feed port A for cladding, and a core-forming polymer melt is fed into feed ports $B_1$ and $B_2$ for the core and the protective layer, respectively. The combined melt streams are discharged through an extruding orifice C. The proportion of the core feed $B_1$ to the outermost layer feed $B_2$ may be determined by means of separate gear pumps or a double gear pump.

In conventional plastic optical fibers comprising a core consisting of a methyl methacrylate-type polymer, which is now being industrially produced the cladding layer usually has a large thickness of approximately 10 to 20 μm because the conventional cladding layer-forming polymer is unsatisfactory in mechanical properties, thermal resistance, and processability. Since the conventional cladding layer-forming polymer is expensive, the large thickness of the cladding layer results in a high cost of the resultant optical fiber.

In the three-layer structured optical fiber of the present invention, the protective layer (8) covers the weak points of the cladding layer and enables the cladding layer to have a smaller thickness than that of the cladding layer of conventional optical fibers. Therefore, the present invention enables the reduction of the production cost of the optical fiber.

The present invention is illustrated in detail by the following examples. In the examples, parts are by weight.

EXAMPLE 1

A polymer for the core and the protective layer was prepared by charging a polymerization vessel equipped with a spiral ribbon-type stirrer with a monomeric mixture of 100 parts of methyl methacrylate, 0.40 part of tert-butyl mercaptan, and 0.0017 part of di-tert-butyl peroxide and by subjecting the mixture to a continuous bulk polymerization procedure at a temperature of 155° C. for an average residence time of four hours. The resultant polymer was fed into a biaxial screw vent-type extruder and was heated at temperatures of 240° C. and 230° C. at the vent portion and the extruding portion, respectively, under a vacuum pressure of 4 mmHg to evaporate volatile substances from the polymer. The resultant dried polymer was supplied, as a polymer for forming a core and a protective layer, into a spinning head of a core-in-sheath-type composite spinning device, maintained at a temperature of 230° C., through a gear pump maintained at a temperature of 230° C.

Separately, a cladding layer-forming polymer was prepared by polymerizing 100 parts of a monomer mixture of 90% by weight of 2,2,3,3-tetrafluoropropyl methacrylate, 8% by weight of methyl methacrylate, and 2% by weight of methacrylic acid in the presence of 0.05 part of azo-bis-isobutyl nitrile and 0.1 part of n-dodecyl mercaptan in an autoclave for bulk polymerization having a capacity of two liters at a temperature of 50° C. for ten hours and then at a temperature of 70° C. for five hours. The resultant polymer exhibited a refractive index of 1.427. The cladding layer-forming polymer was fed into the spinning read of the above-mentioned spinning device, maintained at a temperature of 230° C., by means of a screw melt extruder, maintained at a temperature of 200° C., through a gear pump.

Then the cladding layer-forming polymer and the core- and protective layer-forming polymer were fed into a spinneret, having a nozzle diameter of 3 mm, of the type shown in FIG. 4 at the portions A and B, respectively, thereof and were extruded through the spinning orifices C. The extruded filamentary streams of the polymers were solidified by cooling and were taken up at a velocity of 3 m/min. Subsequently, the composite filaments were drawn in a non-contact-type hot air drawing furnace at a temperature of 140° C. and were wound up to obtain optical fibers of a three-layered structure. The properties of the obtained optical fibers are shown in Table 1. The relationships between the refractive indices of the respective layers were as follows:

$n_1 - n_2 = 0.06$, $n_3 - n_2 = 0.06$, $n_1 = n_3 = 1.49$

TABLE 1

| Experiment No. | Diameter of core (μm) | Thickness of cladding layer (μm) | Thickness of protective layer (μm) | Light transmission loss at 650 nm (dB/km) | Flexing resistance |
| --- | --- | --- | --- | --- | --- |
| 1 | 880 | 4 | 10 | 122 | No peeling at core-cladding interface layer |
| 2 | 886 | 8 | 20 | 123 | No peeling at core-cladding interface layer |
| 3 | 936 | 16 | 16 | 122 | No peeling at core-cladding interface layer |
| 4 | 868 | 16 | 20 | 124 | No peeling at core-cladding interface layer |

In Table 1, the flexing resistance was evaluated by winding an optical fiber around a bobbin 5 mm in diameter and observing the core-cladding layer interface condition of the fiber under a microscope after the fiber-wound bobbin was allowed to stand overnight.

EXAMPLE 2

Optical fibers were prepared according to the same procedures as those described in Example 1 except that in the production of the cladding layer-forming polymer, 2,2,2-trifluoroethyl methacrylate was used in place of 2,2,3,3-tetrafluoropropyl methacrylate. The properties of the obtained optical fibers are shown in Table 2.

The relationships between the refractive indices of the respective layers were as follows:

$n_1 - n_2 = 0.06$, $n_3 - n_2 = 0.06$, $n_1 = n_3 = 1.49$

TABLE 2

| Experiment No. | Diameter of core (μm) | Thickness of cladding layer (μm) | Thickness of protective layer (μm) | Light transmission loss at 650 nm (dB/km) | Flexing resistance |
| --- | --- | --- | --- | --- | --- |
| 5 | 880 | 4 | 16 | 119 | No peeling at core-cladding interface layer |
| 6 | 886 | 8 | 25 | 120 | No peeling at core-cladding interface layer |

TABLE 2-continued

| Experiment No. | Diameter of core (μm) | Thickness of cladding layer (μm) | Thickness of protective layer (μm) | Light transmission loss at 650 nm (dB/km) | Flexing resistance |
|---|---|---|---|---|---|
| 7 | 936 | 16 | 40 | 118 | No peeling at core-cladding interface layer |

EXAMPLE 3

Optical fibers were prepared according to the same procedures as those described in Example 1 except that in the production of the cladding layer-forming polymer, 2,2,3,3,3-pentafluoropropyl methacrylate was used in place of 2,2,3,3-tetrafluoropropyl methacrylate. The properties of the obtained optical fibers are shown in Table 3.

The relationships between the refractive indices of the respective layers were as follows:

$n_1 - n_2 = 0.06$, $n_3 - n_2 = 0.06$, $n_1 = n_3$

TABLE 4

| Experiment No. | Type of core polymer | $n_1$ | $n_1 - n_2$ | $n_3 - n_2$ | $n_1 - n_3$ | Light transmission loss (dB/km) | Flexing resistance |
|---|---|---|---|---|---|---|---|
| 11 | Polystyrene | 1.59 | 0.16 | 0.06 | 0.10 | 160 (630 nm) | No peeling at core-cladding layer interface |
| 12 | Polycarbonate | 1.58 | 0.15 | 0.06 | 0.09 | 1,250 (770 nm) | No peeling at core-cladding layer interface |
| 13 | Deuterated polymethyl methacrylate* | 1.49 | 0.06 | 0.06 | 0 | 50 (670 nm) | No peeling at core-cladding layer interface |
| 14 | Deuterated polystyrene** | 1.59 | 0.16 | 0.06 | 0.10 | 120 (690 nm) | No peeling at core-cladding layer interface |

Note:
*Deuterated polymethyl methacrylate containing 0.4 mg of a hydrogen atom per 1 g of the polymer as determined at a frequency of 100 MHz by a nuclear magnetic resonance method
**Deuterated polystyrene containing 0.7 mg of a hydrogen atom per 1 g of the polymer as determined at a frequency of 100 MHz by a nuclear magnetic resonance method

TABLE 3

| Experiment No. | Diameter of core (μm) | Thickness of cladding layer (μm) | Thickness of protective layer (μm) | Light transmission loss at 650 nm (dB/km) | Flexing resistance |
|---|---|---|---|---|---|
| 8 | 882 | 5 | 15 | 118 | No peeling at core-cladding interface layer |
| 9 | 900 | 7 | 30 | 121 | No peeling at core-cladding interface layer |
| 10 | 892 | 14 | 20 | 119 | No peeling at core-cladding interface layer |

EXAMPLE 4

The same polymers as those shown in Table 4 as a core-forming polymer, the same polymer as that used in Example 1 as a cladding layer-forming polymer and the same polymethyl methacrylate, as that described in Example 1 as the polymer for the protective layer were subjected to a three-layer composite spinning procedure to prepare three-layer structured optical fibers having a core diameter of 190 μm, a cladding-layer thickness of 10 μm, and a protective layer thickness of 20 μm. The properties of the obtained optical fibers are shown in Table 4.

EXAMPLE 5

Optical fibers were prepared according to the same procedures as those described in Example 1 except that in the production of the cladding layer-forming polymer a mixture of 50% by weight of 2,2,3,3,3-pentafluoropropyl acrylate, 47% by weight of methyl methacrylate, and 3% by weight of methacrylic acid was used in place of 2,2,3,3-tetrafluoropropyl methacrylate. The properties of the obtained optical fibers are shown in Table 5.

The relationship between the refractive indices of the respective layers were as follows:

$n_1 - n_2 = 0.04$, $n_3 - n_2 = 0.04$, $n_1 = n_3 = 1.49$

TABLE 5

| Experiment No. | Diameter of core (μm) | Thickness of cladding layer (μm) | Thickness of protective layer (μm) | Light transmission loss at 650 nm (dB/km) | Flexing resistance |
|---|---|---|---|---|---|
| 15 | 880 | 4 | 16 | 120 | No peeling at core-cladding interface layer |
| 16 | 886 | 8 | 25 | 120 | No peeling at core-cladding interface layer |
| 17 | 850 | 16 | 25 | 123 | No peeling at core-cladding interface layer |

COMPARATIVE EXAMPLE 1

A three-layered optical fiber was prepared according to the same procedures as those described in Example 1 except that the claddig layer-forming polymer was produced from 82 parts of 2,2,3,3,3-pentafluoropropyl methacrylate and 18 parts of methyl methacrylate. The light transmission loss at 650 nm of the obtained optical fiber was 220 B/km. When the optical fiber was wound around a bobbin having a diameter of 5 mm and was allowed to stand overnight, a number of cracks were generated in the optical fiber.

COMPARATIVE EXAMPLE 2

A core-in-sheath, two-layered optical fiber was prepared according to the same procedures as those described in Example 1 except that a conventional core-in-sheath-type spinneret was substituted for the three-layer-type spinneret. The obtained optical fiber had a core diameter of 980 μm and a cladding layer thickness of 6 μm. The light transinmmision loss of the optical fiber 158 dB/km determined in the same manner as that described in Example 1. When the optical fiber was wound around a bobbin having a diameter of 5 mm and was allowed to stand overnight, a number of cracks were generated in the optical fiber.

We claim:

1. A plastic optical fiber comprising:
   (1) a core consisting of a polymeric material and having a refractive index $n_1$,
   (2) a cladding layer consisting of a polymeric material and having a refractive index $n_2$, and
   (3) a protective layer consisting of a polymeric material and having a refractive index $n_3$, which optical fiber is characterized in that said refractive indices $n_1$, $n_2$, and $n_3$ satisfy the relationships $$n_1 - n_2 \geq 0.01$$

and $$n_3 - n_2 > 0$$

and in that said cladding layer-forming polymeric material consists essentially of a copolymer of:
   (A) 20% to 99.95% by weight of at least one fluorine-containing-comonomer selected from the group consisting of fluoroalkyl acrylates and fluoroalkyl methacrylates;
   (B) 0.05% to 10% by weight of at least one vinyl comonomer having a hydrophilic radical; and
   (C) 0% to 79.95% by weight of at least one other vinyl comonomer capable of copolymerizing with the above-mentioned comonomers (A) and (B).

2. The plastic optical fiber as claimed in claim 1, wherein said cladding layer has a thickness of from 1 to 30 μm.

3. The plastic optical fiber as claimed in claim 1, wherein said refractive index $n_1$ of said core is substantially equal to said refractive index $n_3$ of said protective layer.

4. The plastic optical fiber as claimed in claim 1 or 2, wherein said fluorine-containing comonomer (A) is selected from the group consisting of 2,2,2-trifluoroethyl acrylate and methacrylate, 2,2,3,3-tetrafluoropropyl acrylate and methacrylate, and 2,2,3,3,3-pentafluoropropyl acrylate and methacrylate.

5. The plastic optical fiber as claimed in claim 1 or 2, wherein said hydrophilic vinyl comonomer (B) is selected from the group consisting of ethylenically unsaturated mono- and di-carboxylic acids.

6. The plastic optical fiber as claimed in claim 5, wherein said ethylenically unsaturated monocarboxylic acid is selected from the group consisting of acrylic acid and methacrylic acid.

7. The plastic optical fiber as claimed in claim 1 or 2, wherein said hydrophilic vinyl comonomer (B) is selected from ethylenically unsaturated epoxy comonomers.

8. The plastic optical fiber as claimed in claim 1 or 2, wherein said hydrophilic vinyl comonomer (B) is selected from the group consisting of ethylenically unsaturated carboxylic amides, N-alkylcarboxylic amides, N-methylolcarboxylic amides, and alkyl ethers of the above-mentioned amides.

9. The plastic optical fiber as claimed in claim 8, wherein said ethylenically unsaturated carboxylic amide is selected from the group consisting of acrylamide, methacrylamide, N-methylacrylamide, and N,N'-diethylacrylamide and said alkyl ethers of the above-mentioned amides are selected from the group consisting of methyl ethers and ethyl ethers of said amides.

10. The plastic optical fiber as claimed in claim 1 or 2, wherein said hydrophilic vinyl comonomer (B) is selected from ethylenically unsaturated polycaboxylic acids.

11. The plastic optical fiber as claimed in claim 1, wherein said refractive indexes of the core and the protective layer (3) are 1.44 or more, respectively.

12. The plastic optical fiber as claimed in claim 1, wherein said core-forming polymeric material consists essentially of at least one member selected from the group consisting of polystyrene, polymethyl methacrylate, methyl methacrylate copolymers comprising at least 70% by weight of copolymerized methyl methacrylate, polycarbonates, deuterated styrene polymers comprising at least 70% by weight of polymerized styrene which has been deuterated at a degree of deuteration of at least 50%, and deuterated methyl methacrylate polymers comprising 70% by weight or more of polymerized methyl methacrylate which has been deuterated at a degree of deuteration of 50% or more.

13. The plastic optical fiber as claimed in claim 1, wherein said cladding layer-forming polymeric material comprises a copolymer of:
   20% to 99.95% by weight of fluoroalkyl methacrylate,
   0.05% to 10% by weight of at least one vinyl comonomer having a hydrophilic radical, and
   0% to 79.95% by weight of at least one other comonomer capable of copolymerizing with the above-mentioned comonomers.

14. The plastic optical fiber as claimed in claim 1, wherein said protective layer-forming polymeric material comprises at least one methylmethacrylate polymer comprising at least 70% by weight of polymerized methylmethacrylate.

* * * * *